United States Patent
Noble et al.

[11] Patent Number: 5,978,842
[45] Date of Patent: *Nov. 2, 1999

[54] DISTRIBUTED-CLIENT CHANGE-DETECTION TOOL WITH CHANGE-DETECTION AUGMENTED BY MULTIPLE CLIENTS

[75] Inventors: Alan C. Noble, Santa Cruz; Matthew P. Freivald, Sunnyvale, both of Calif.

[73] Assignee: NetMind Technologies, Inc., Cambell, Calif.

[ * ] Notice: This patent is subject to a terminal disclaimer.

[21] Appl. No.: 08/896,966

[22] Filed: Jul. 18, 1997

Related U.S. Application Data

[63] Continuation-in-part of application No. 08/783,625, Jan. 14, 1997, Pat. No. 5,898,836.

[51] Int. Cl.⁶ .................................................. H04L 12/00
[52] U.S. Cl. ........................ 709/218; 709/203; 709/219; 709/224; 709/245; 709/246; 707/10; 707/513; 707/201
[58] Field of Search ................................ 709/203, 218, 709/219, 224, 245, 246; 707/10, 513, 201

[56] References Cited

U.S. PATENT DOCUMENTS

| | | | |
|---|---|---|---|
| 5,388,255 | 2/1995 | Pytlik et al. ................................. | 707/4 |
| 5,452,459 | 9/1995 | Drury et al. ................................ | 395/700 |
| 5,453,779 | 9/1995 | Dan et al. ................................... | 348/7 |
| 5,471,629 | 11/1995 | Risch ......................................... | 395/800 |
| 5,479,654 | 12/1995 | Squibb ....................................... | 707/201 |
| 5,491,820 | 2/1996 | Belove et al. ............................. | 395/600 |
| 5,499,364 | 3/1996 | Klein et al. ............................... | 395/200 |
| 5,517,606 | 5/1996 | Matheny et al. ......................... | 395/156 |
| 5,522,070 | 5/1996 | Sumimoto .................................. | 395/650 |
| 5,526,524 | 6/1996 | Madduri ..................................... | 395/726 |
| 5,559,984 | 9/1996 | Nakano et al. ............................ | 395/448 |
| 5,577,251 | 11/1996 | Hamilton et al. ......................... | 395/671 |
| 5,592,664 | 1/1997 | Starkey ..................................... | 395/600 |
| 5,630,116 | 5/1997 | Takaya et al. ............................ | 707/201 |
| 5,745,900 | 4/1998 | Burrows .................................... | 707/102 |
| 5,751,956 | 5/1998 | Kirsch ....................................... | 709/245 |
| 5,802,299 | 9/1998 | Logan et al. .............................. | 709/246 |
| 5,812,776 | 9/1998 | Gifford ...................................... | 709/203 |
| 5,813,007 | 9/1998 | Nielsen ...................................... | 707/10 |
| 5,890,164 | 3/1999 | Nielsen ...................................... | 707/201 |
| 5,898,836 | 4/1999 | Freivald et al. ........................... | 707/513 |

OTHER PUBLICATIONS

"Future Distributed Computing", & "PC Size, Mainframe Power", Seltzer, L. PC Magazine, Mar. 25, 1997, pp. 198–200,202,204.

"What happens when you click", Randall, N. PC Magazine, Oct. 22, 1996, p. 245–246.

*Primary Examiner*—Ahmad F. Matar
*Assistant Examiner*—William D. Thomson
*Attorney, Agent, or Firm*—Stuart T. Auvinen

[57] ABSTRACT

A distributed-client change-detection tool detects changes in Internet web-page documents on the world-wide-web. To register a web page for change detection with a change-detection server, a user specifies the web page's URL. A client-side change-detection application is downloaded to the user's client from the change-detection server. The server assigns a date and time for the client to perform change detection. At the assigned time and date, the client fetches a new copy of the web page and compares it to an archived copy to detect changes. When the client detects a change, it sends a notification with the URL to the server. The server verifies that the change has not already been reported by another user's client and then notifies all users of the registered web page. As more users are registered for a web page, change detection is performed more frequently. The most popular pages with tens of thousands of registered users are checked every few minutes. Each user is notified within minutes of any changes in the registered web page, even though any one user only performs change-detection once a month. Checksums rather than entire web pages can be stored and compared to reduce storage requirements at the server. The change-detection server performs its own change-detection for less popular web pages. More popular web pages are checked more frequently using the additional client resources of the users.

20 Claims, 11 Drawing Sheets

USER/CLIENT SETUP

CLIENT SCHEDULED COMPARE

CLIENT NOTIFIES SERVER

SERVER NOTIFIES ALL CLIENTS

DISTRIBUTED-CLIENT CHANGE-DETECTION TOOL WITH CHANGE-DETECTION AUGMENTED BY MULTIPLE CLIENTS

BACKGROUND OF THE INVENTION—RELATED APPLICATION

This application is a continuation-in-part of the application for "Change-Detection Tool Indicating Degree and Location of Change of Internet Documents by Comparison of CRC Signatures", U.S. Ser. No. 08/783,625, filed Jan. 14, 1997 now U.S. Pat. No. 5,898,836.

BACKGROUND OF THE INVENTION—FIELD OF THE INVENTION

This invention relates to software retrieval tools for networks, and more particularly for a distributed change-detection tool for the Internet using pooled client resources.

BACKGROUND OF THE INVENTION—DESCRIPTION OF THE RELATED ART

The world-wide-web (www) is the fastest-growing part of the global network known as the Internet. Documents on the web's servers are known as web pages. These web pages are frequently changed. Users often wish to know when changes are made to certain web pages.

Change-notification application software is available for personal computers (PC's). An example is the notify feature of Symantec's Internet Fast Find. This application software runs on the user's PC and periodically fetches a web page from the Internet and compares the newly fetched page to an archived copy of the page. If a mis-match occurs, the user is notified that a change was detected, by a pop-up message window and a highlighted bookmark.

FIG. 1 is a diagram of users each running change-notification software. User application software (apps) 5, 6, 7, 8 run separately on different PC's. Each user app periodically connects to Internet 10 and fetches a web-page document from document server 12. Each user app 5–8 separately compares its newly fetched web page to an archived copy. When a change is detected, the local PC's user is notified. None of the other users is notified.

Each user app 5–8 can set a convenient time to fetch and compare the web page document. Some of user app 5–8 may not have a direct Internet connection, but instead must occasionally dial-up an Internet Service Provider (ISP) to fetch the document. Each user app 5–8 performs change detection at different times. Often change-detection is done infrequently as the user may not dial-in to the ISP on a particular day, or the user may not wish to devote his PC's resources to frequent change detection. One user with a direct Internet connection and spare computing resources may detect the change quickly, while other users do not detect the change until they perform their own change detection, perhaps hours or days later. There is no sharing of information among user apps 5–8. Each is a stand-alone application.

Server-Based Change-Detection Tool of Parent Application

The parent application disclosed a server-based change-detection tool that allows many different user clients to register web pages with the server. These registered web pages are periodically fetched by the change-detection server and compared to a stored checksum for the registered page to determine if a change has occurred. When a change is detected by the server, the user is notified by e-mail. The change-detection server of the parent application allows user to select portions of a web-page document for change detection while other portions are ignored.

Such a server-based change-detection tool as described in detail in the parent application is indeed useful and has gained popularity with Internet users, as several hundred thousand web pages have been registered. For example, patent professionals can register the federal regulations and procedures (37 C.F.R. and the M.P.E.P) posted at the PTO's web site and are notified when any changes are made. The change-detection tool is currently free for public use at the www.netmind.com web site.

Current Server-Based Tool Not Easily Scalable

While such a change-detection tool is useful as is evident by its popularity, the increasing number of web pages registered increases the change-detection work required of the server. Network traffic into and out of the server increases as more pages need to be periodically checked. As more pages are registered, each page is checked for changes less frequently, resulting in a decreasing quality of service.

The server must be expanded as additional pages are registered to maintain detection frequency. This expansion is expensive and slow as additional servers must be purchased and installed. Predicting future user demand and the additional server capacity required is difficult. Additional network bandwidth to the Internet, such as T1 phone lines, must be ordered several weeks in advance. Thus scaling the server-based change-detection tool is expensive and slow.

What is desired is an automated change-detection tool that detects when changes occur to a registered document on the Internet. An easily or automatically scalable change-detection tool is desired. It is desired to automatically increase computing and network resources as additional pages are registered by additional clients. It is desired for the user's clients to supply these additional resources to reduce capital outlays for additional servers. It is also desired that the registered web pages be obtained from any arbitrary document anywhere on the Internet.

SUMMARY OF THE INVENTION

A change-detection server coordinates detection of changes in web pages by a plurality of clients. The change-detection server has a network connection for transmitting and receiving packets from a plurality of remote clients and from a remote web-page server.

A responder is coupled to the network connection. It communicates with the plurality of remote clients. The responder registers a web page for change detection by receiving from a remote client in the plurality of remote clients a uniform-resource-locator (URL) identifying the web page.

An application downloader downloads a change-detection application to the remote client when the web page is registered by the remote client. The change-detection application periodically re-fetches the web page from the remote web-page server by transmitting the URL from the remote client directly to the remote web-page server.

A scheduler generates an assigned time for the remote client to re-fetch the web page. The assigned time is downloaded to the remote client during registration.

A server database is coupled to the responder-scheduler. It receives the URL from the responder-scheduler and receives the assigned time from the scheduler after the web page is registered by the remote client. The server database stores a plurality of records each containing a URL and a plurality of assigned times.

A client keeper on the change-detection server is coupled to the server database and the network connection. It receives change notices from the plurality of remote clients. A detection notice is generated by the change-detection application on the remote client when the web page that was re-fetched from the web-page server does not match an archived web page.

A notifier on the change-detection server is coupled to the client keeper and the server database. It generates change notices to all remote clients that registered the web page that generated the detection notice.

Thus all remote clients are notified of a change when change-detection applications in the plurality of remote clients detects a change. The change-detection server assigns times for change detection by the plurality of remote clients.

In further aspects of the invention the assigned time for change detection is different for each remote client. Thus change detection by the plurality of remote clients occurs at different assigned times. Each remote client can perform change detection less than once a day while change detection is performed at least once a day by at least one of the plurality of remote clients for any date.

In still further aspects the server database does not store the web page. Instead, the server database stores a checksum of the web page. Thus storage requirements for the server database are reduced by archiving the checksum and not entire web pages.

In still further aspects a server-side minder is coupled to the server database and the network connection. It periodically re-fetches the web page from the remote web-page server by transmitting the URL from the server database to the network connection. The server-side minder receives a fresh copy of the web page from the remote web-page server. The server-side minder generates the detection notice to the client keeper when the fresh copy of the web page does not match archived web page. Thus both the change-detection server and the plurality of remote client perform change detection.

In other aspects a verifier in the client keeper verifies that the detection notice is for a new change and not for a change that has already been reported by another remote client. The verifier discards the detection notice and does not generate the change notices when the verifier determines that the detection notice is not for a new change.

DETAILED DESCRIPTION

The present invention relates to an improvement in change-detection client-server software. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Overview of Change-Detection Web Server

Figure 1:
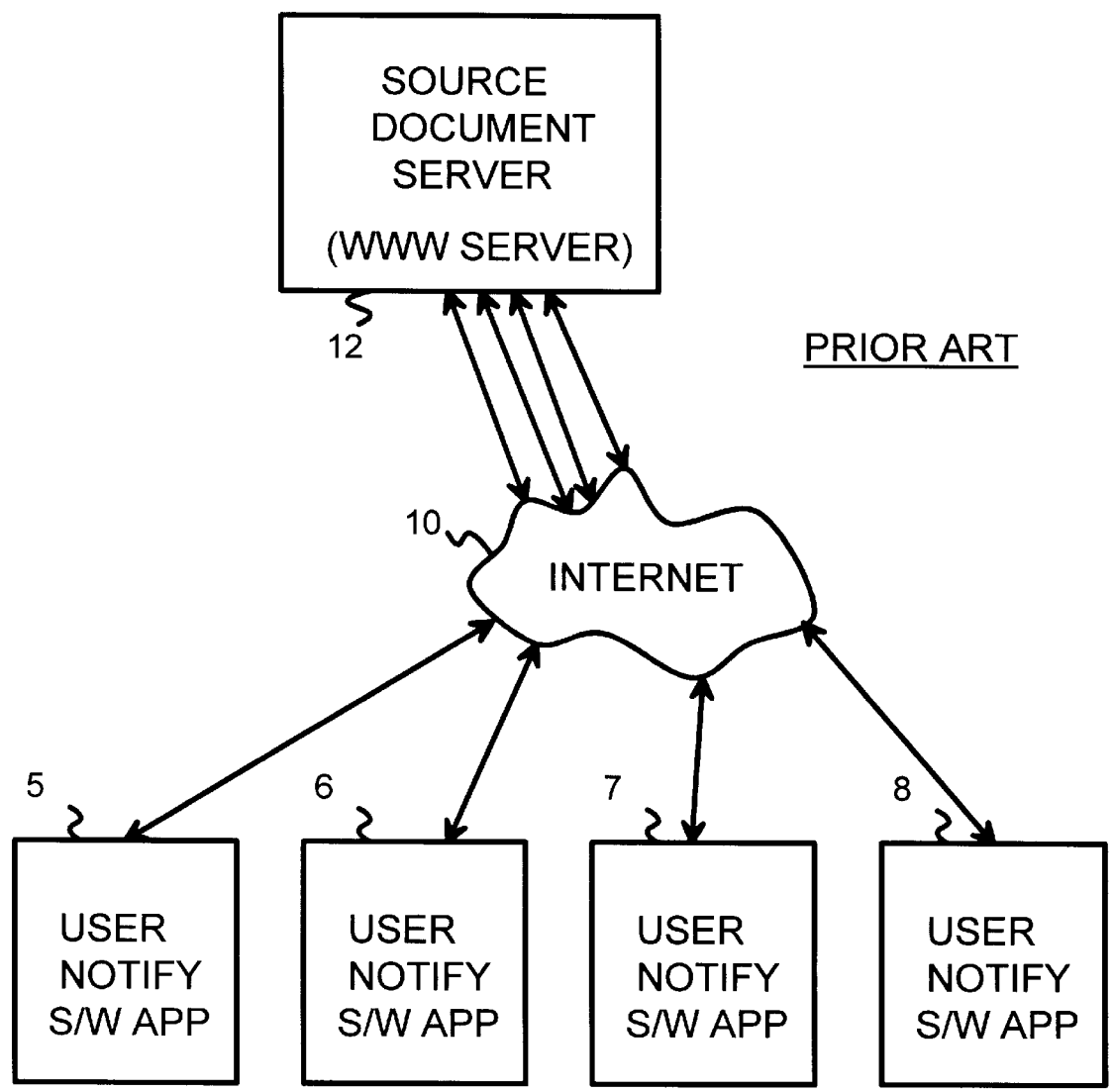
FIG. 1 is a diagram of users each running change-notification software.
Figure 2:
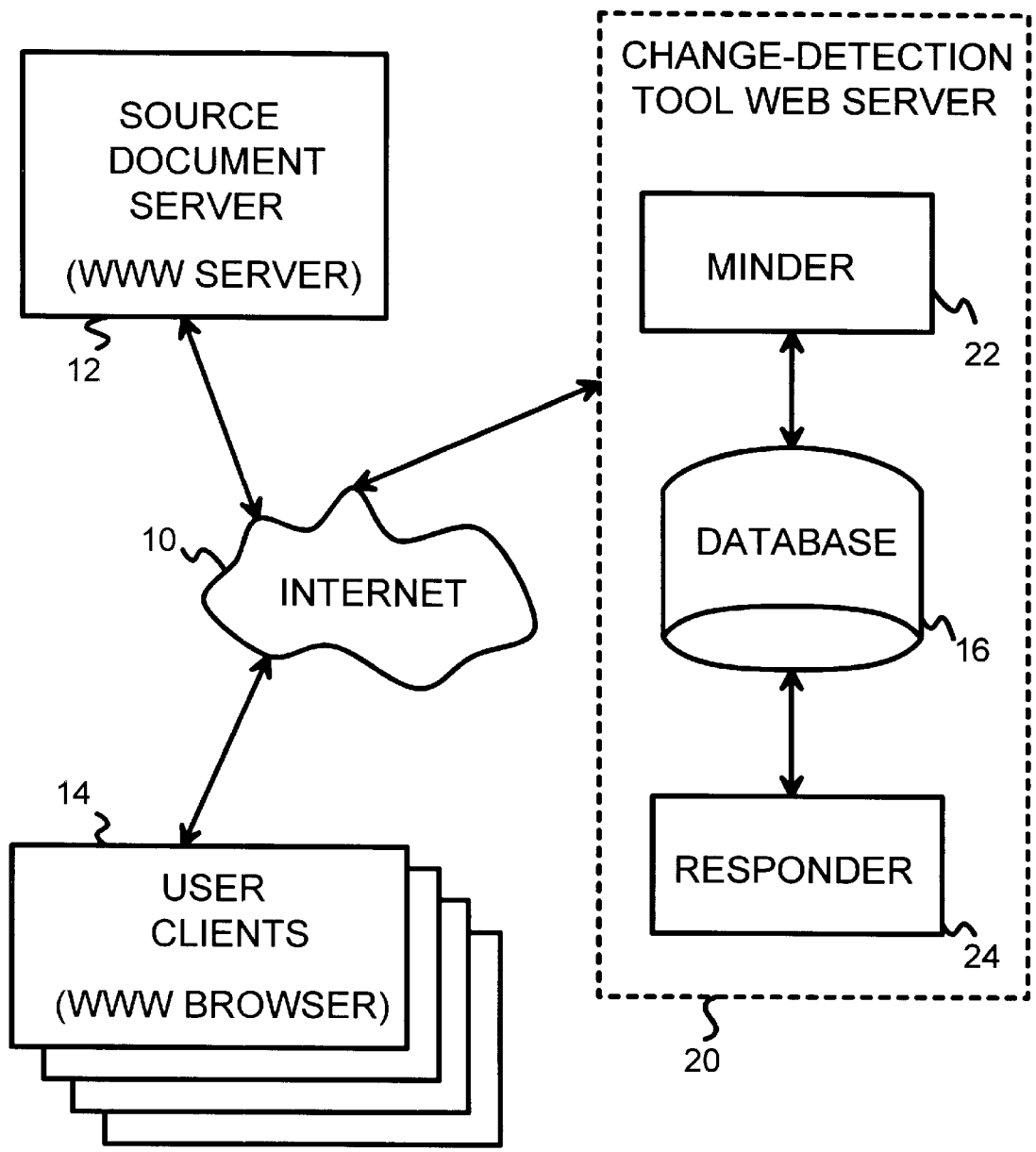
FIG. 2 is a diagram of a change detection tool on a server on the Internet.

FIG. 2 is a diagram of a change detection tool on a server on the Internet. Additional details of the change-detection tool are given in the parent application. Different users operate clients 14 from remote sites on Internet 10. These users typically operate browser applications, such as Netscape's Navigator or Microsoft's Internet Explorer, or browser mini-applications such as an Internet toolbar in a larger program. Clients 14 communicate through Internet 10 by sending and receiving TCP/IP packets to establish connections with remote servers, typically using the hypertext transfer protocol (http) of the world-wide web.

Server-Based Change-Detection Tool of Parent Application

Clients 14 retrieve web pages of files from document server 12 through Internet 10. These web pages are identified by a unique URL (uniform resource locator) which specifies a document file containing the text and graphics of a desired web page. Often additional files are retrieved when a document is retrieved. The "document" returned from document server 12 to clients 14 is thus a composite document composed of several files of text, graphics, and perhaps sound or animation. The physical appearance of the web page on the users' browsers on clients 14 is specified by layout information embedded in non-displayed tags, as is well known for HTML (hyper-text markup language) documents. Often these HTML documents contain tags with URL's that specify other web pages, perhaps on other web servers which may be physically located in different cities or countries. These tags create hyper-links to these other web servers allowing the user to quickly jump to other servers. These hyper-links form a complex web of linked servers across the world; hence the name "world-wide web". The users may frequently retrieve files from remote document server 12. Often the same file is retrieved. The users may only be interested in differences in the file or learning when the file is updated, such as when a new product or service is announced. The inventors have developed a software tool that automatically retrieves files and compares the retrieved files to an archived checksum of the file to determine if a change in the file has occurred. When a change is detected, the user is notified by an electronic mail message (e-mail). A copy of the new file may be attached to the e-mail notification, allowing the user to review the changes.

Rather than archive the source files from remote document server 12, the invention described in the parent application archives a checksum or CRC of the source files. These CRC's and the e-mail address of the user are stored in database 16 of change-detection server 20. Comparison is made of the stored or archived CRC of the document and a fresh CRC of the currently-available document. The CRC is a condensed signature or fingerprint of the document. Any change to the document changes the CRC. Alternately, each section of a document can have it's own CRC.

Change-detection server 20 performs three basic functions:

1. Register (setup) a web page document for change detection.
2. Periodically re-fetch the document and compare for changes
3. E-mail a change notice to the registered user if a change is detected.

Change-detection server 20 contains three basic components. Database 16 stores the archive of CRC's for registered web-page documents. The URL identifying the web page and the user's e-mail address are also stored with the archived CRC's. Responder 24 communicates with users at clients 14 to setup or register a web page document for change detection. Minder 22 periodically fetches registered documents from document server 12 through Internet 10. Minder 22 compares the archived CRC's in database 16 to new CRC's of the fetched documents to determine if a change has occurred. When a change is detected, minder 22 sends a notice to one or more of the users at clients 14 that the document has changed.

Change-Detection of Web Pages

This change-detection tool is disclosed in the co-pending parent application, "Changes-Detection Tool Indicating Degree and Location of Change of Internet Documents by Comparison of CRC Signatures", U.S. Ser. No. 08/783,625, filed Jan. 14, 1997, now U.S. Pat. No. 5,898,836, hereby incorporated by reference. A basic change-detection tool without client-side change detection has been available for free public use at the inventor's web site, www.netmind.com, for more than a year before the filing date of the parent application. The existing "URL-minder" has over 325,000 documents or URL's registered for 2.4 million users. All change detection is performed by the server on the existing change-detection tool. Change detection is not performed by any of the clients.

Client-Side Change Detection

While the change-detection tool of the parent application could be used to detect changes in registered web pages, scalability is problematic. Additional registered pages require the purchase of additional servers and network hardware to maintain a high checking frequency.

The inventors have realized that the clients can be made capable of performing limited change detection. Users can contribute some of their computing resources, allowing the change-detection server to remain a free service even as the workload increases.

Small programs or applications can be downloaded from the server to the client to perform change detection. Such applications can be written in Sun Microsystems's JAVA, Microsoft's ActiveX, or native programming languages. JAVA applications are commonly used today for animated advertising on web pages. More useful applications for change-detection can be written to periodically fetch the registered web document and compare it to an archived copy or checksum.

Pooling of Client Resources by Server

While these applications could perform change detection only for the user, the user's resources could easily become overtaxed by frequent change detection. Thus, the client-side change-detection application should only perform infrequent change detection.

The inventors have realized that the applications on individual clients can pool their resources to perform frequent change detection for the benefit of all users. Each user performs change detection for all the users. The inventors have noted than large numbers of users register the same web pages. Users can benefit from frequent change detection by the group's pooled change detection, even though each individual user performs change detection only infrequently.

Some pages have thousands of registered users. If user is assigned a different date and time to perform change detection, then change detection is performed a thousand times a month, about once every few minutes. Although each user only performs change detection once a month, with a thousand users checking for changes, any change in the registered document is detected within a few minutes of the new change.

Distributed Client-Server Change Detection Inherently Scalable

As more users register a web page, change detection is performed more frequently. Thus, popular web pages are check frequently, at a higher rate than possible by a resource-limited server. Distributed change detection is automatically and inherently scalable, because as more users are added, more frequent change-detection is performed using the user client resources rather than the server. Less popular web pages are still checked at least weekly by the server, while popular web pages are checked orders of magnitude more frequently, possibly every few minutes.

Server Coordinates Distributed-Client Change-Detection

The change-detection server offloads some of the change-detection workload to the clients. The server can still perform weekly or daily change detection, but allow popular web pages to be checked with much greater frequency by the pool of clients. The server schedules a different time and date for a client to perform change detection when the user registers a web page. A change-detection application is downloaded to the client. When the client detects a change, it immediately notifies the server. The server can re-check the page to verify that a change actually occurred, and then notify all users. Thus, one of the clients tells the server when a change is detected, and the server then notifies all the users of the change.

Figure 3:
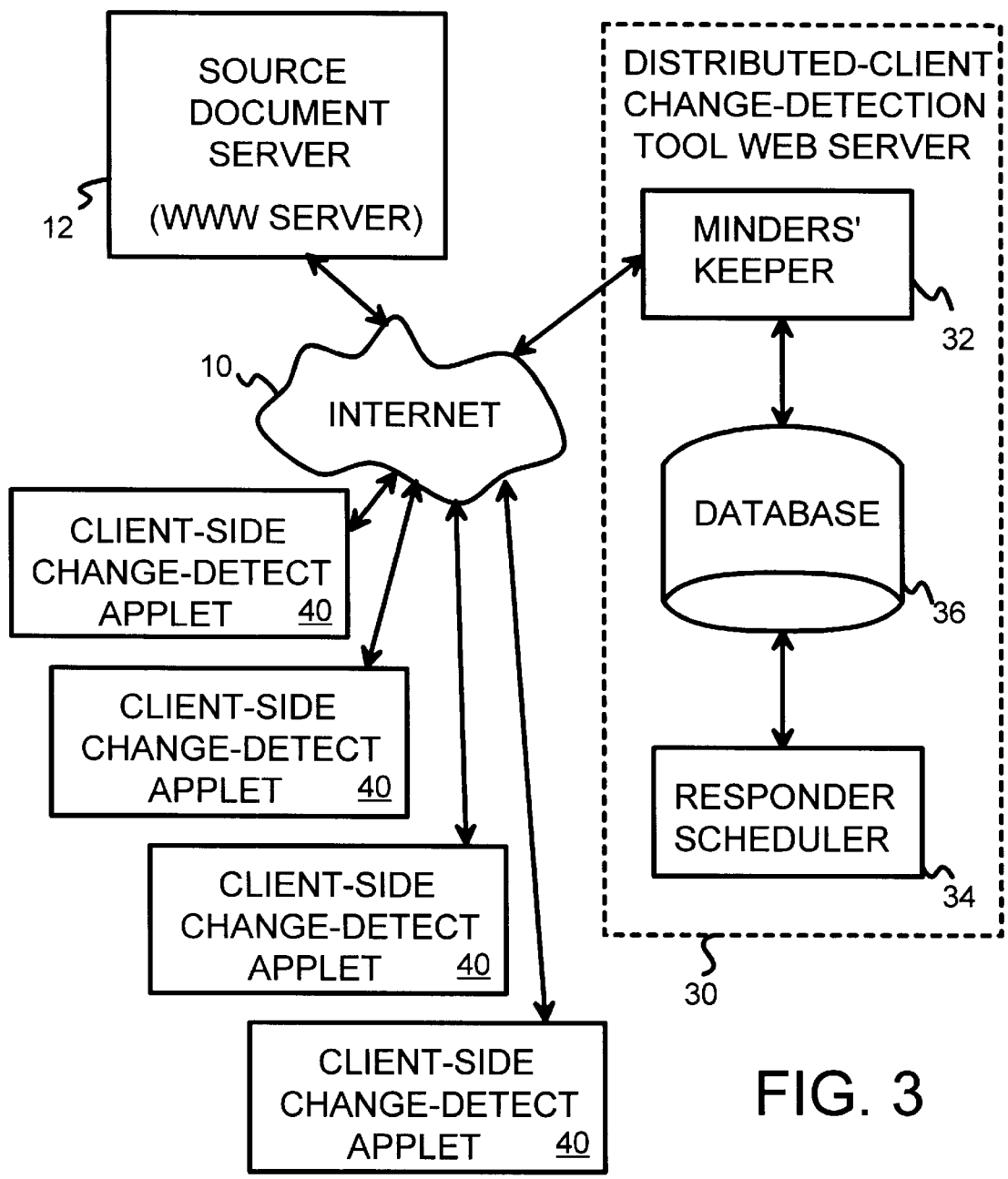
FIG. 3 is a diagram of a distributed-client change-detection tool coordinated by a server.

Distributed-Client-Server Change Detection—FIG. 3

FIG. 3 is a diagram of a distributed-client change-detection tool coordinated by a server. Different users operate clients 40 from remote sites on Internet 10. These users typically operate browser applications capable of executing plug-in applications such as those written in JAVA. A change-detection thin-client application or client-side minder has been downloaded to each client 40 from change-detection server 30.

Change-detection server 30 performs these basic functions:

1. Register (setup) a web page document for change detection and download a client-side change-detection (minder) application to the user's client.
2. Periodically re-fetch the document and compare for changes.
3. Receive change notices from clients and check for validity.
4. E-mail a change notice to all the registered users if a change is detected by either the server or one of the clients.

Change-detection server 30 contains three basic components. Database 36 stores the archive of documents or CRC's of the documents for registered web-page documents. The URL identifying the web page and the user's e-mail address and assigned date and time for client-side change detection are also stored. Responder-scheduler 34 downloads the client-side change-detection application, the client-side minder, to users at clients 40. Responder-scheduler 34 sets up or registers a web page document and assigns the date/time for client-side change detection.

Minders' keeper 32 keeps track of all the client-side minders, receiving change-detection notices from the client-side minders operating on clients 40. Minders' keeper 32 performs its own change detection to confirm that the client minder correctly found a new change that has not already been reported by another client's minder application. When a new change is detected, minders' keeper 32 sends a notice to all of the users at clients 40 that the document has changed.

Minders' keeper 32 also periodically fetches registered documents from document server 12 through Internet 10 for server-side change detection. Minders' keeper 32 compares the archived document or CRC in database 36 to the newly-fetched document or its CRC to determine if a change has occurred. Notification of users is made if a change is detected. Server-side change detection is necessary for less-popular web pages having only a few registered users.

Overview of Operation—FIGS. 4, 5, 6, 7

Figure 4:
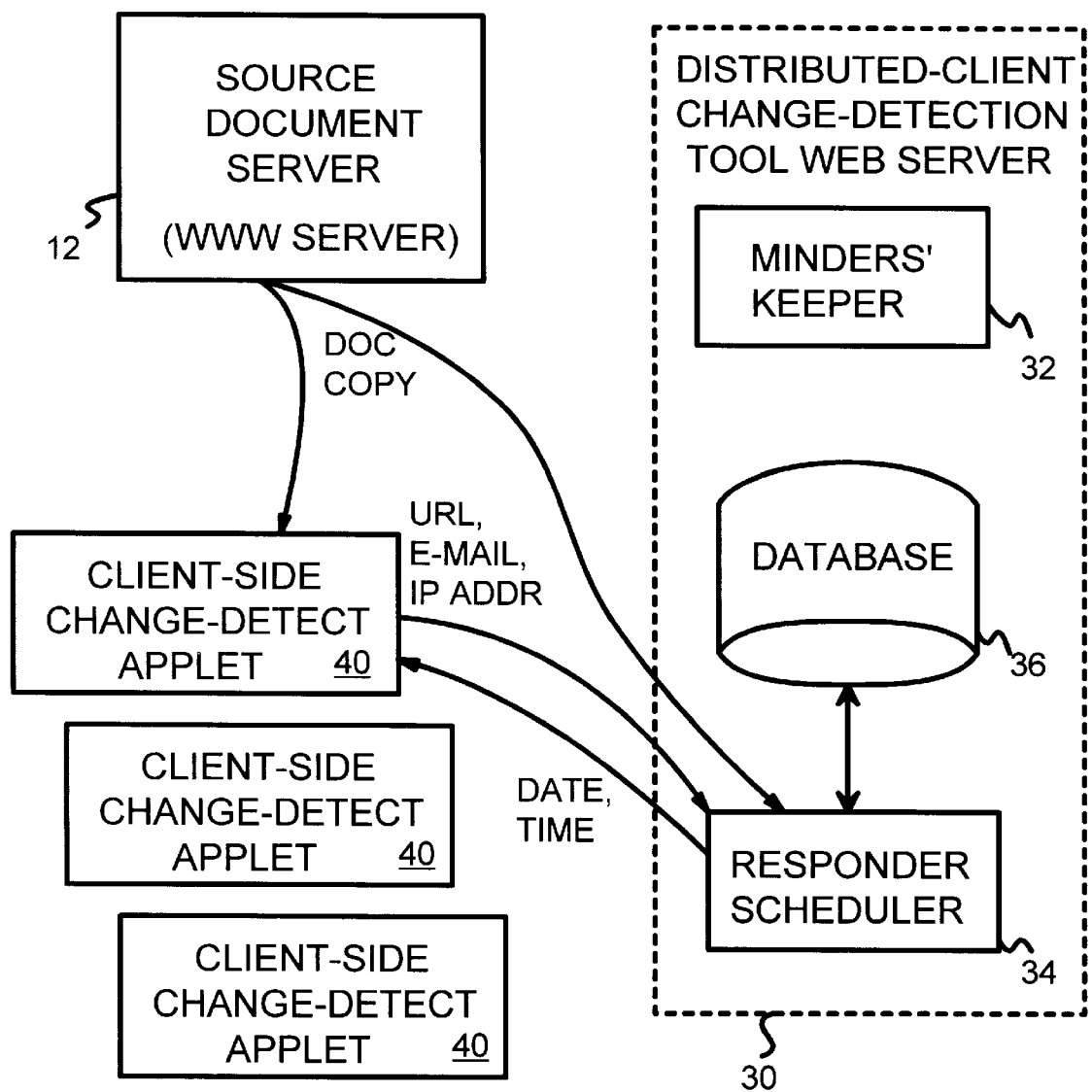
FIG. 4 shows a user registering a web page document and downloading a client-side minder application for change detection.

FIG. 4 shows a user registering a web page document and downloading a client-side minder application for change detection. The user on client 40 connects to responder-scheduler 34 by browsing the web site of change-detection server 30. Responder-scheduler 34 downloads the client-side change-detection application including the client-side minder to client 40 as part of the registration process. The user registers a web page document by specifying the URL identifying the web page. A portion of the URL is translated into an Internet-Protocol (IP) address of a server by a domain-name server. The user also sends his e-mail address to responder-scheduler 34.

Responder-scheduler 34 then stores the document or its CRC, the URL, the date and time for the client's change detection, and the user's e-mail address in database 36. The user's IP address may also be stored. The date and time for the client-side minder to perform change-detection and a confirmation that the web page document has been registered are sent to the user on client 40 to complete registration. The time and date can be sent to the client using e-mail, or the client can be polled on a regular basis by the server.

Figure 5:
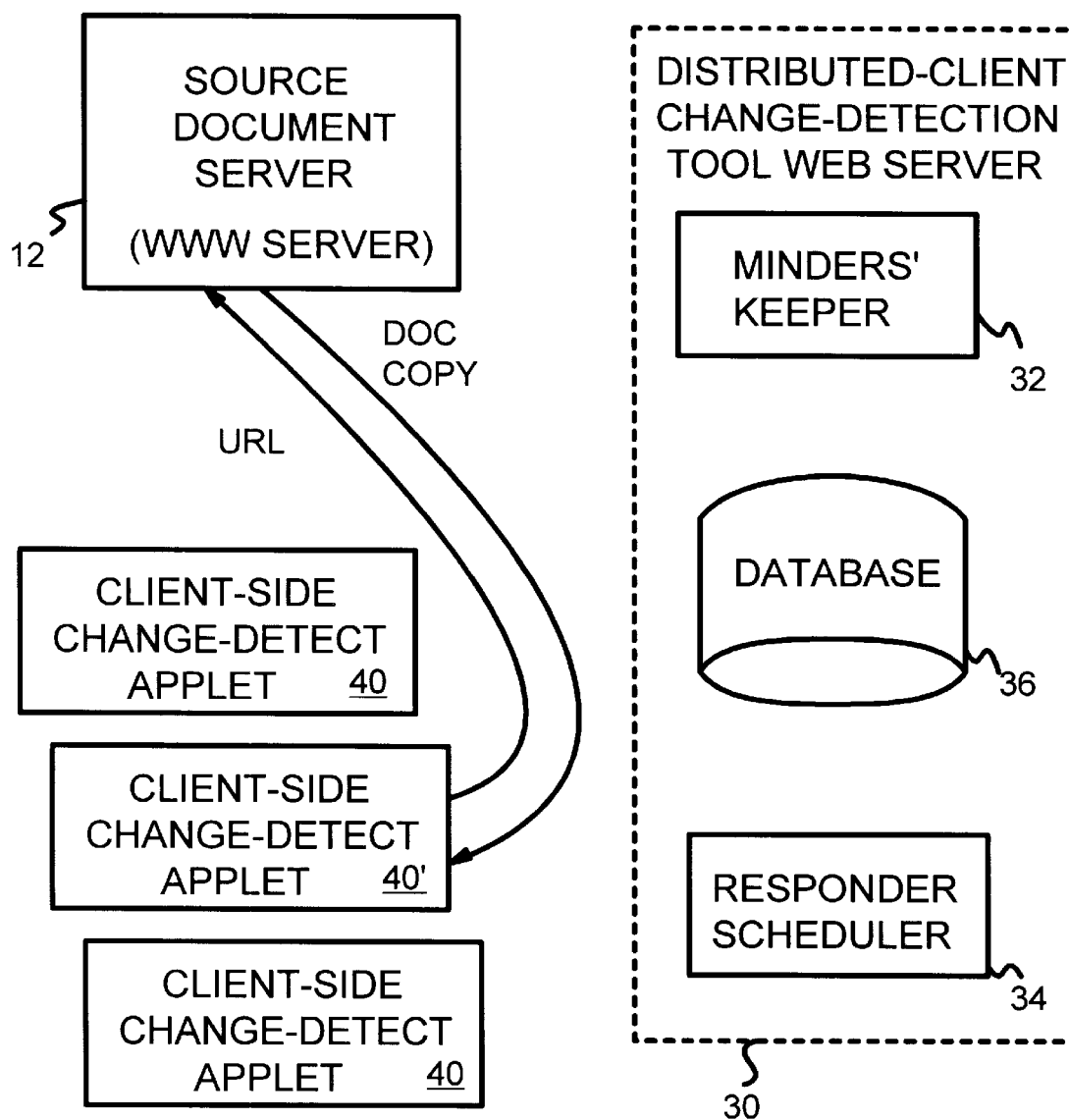
FIG. 5 shows a client-side application performing change detection of a registered web page document scheduled by the change-detection server.

FIG. 5 shows a client-side application performing change detection of a registered web page document scheduled by the change-detection server. Each registered document is compared for changes by each of clients 40 on a scheduled basis, which depends on the number of registered users and their resources. FIG. 5 shows another client 40' performing its scheduled change detection for the benefit of all users.

The minder application on client 40' reads the URL of the registered document from the client application's small database. Client 40' automatically fetches from document server 12 a fresh copy of the web-page document pointed to by the URL. Change-detection server 30 is not involved in this transaction. Occasionally the URL is deleted or does not respond, and a change is then signaled indicating that the URL could not be fetched. Client 40' may try to fetch the document again after several hours so that temporary shut-downs do not generate spurious change notices. Some clients that do not have direct Internet connections, or that are not left running all the time, may not perform their change detection at the scheduled time. Instead, change detection is performed when the client PC is turned on again or when the next dial-up connection is made to the Internet.

Once a fresh copy of the registered document has been fetched from the Internet, the CRC of the fresh document may be generated. The CRC is compared to archived CRC's stored in the database on client 40'. A mis-compare of the CRC or the document indicates that the document changed.

Figure 6:
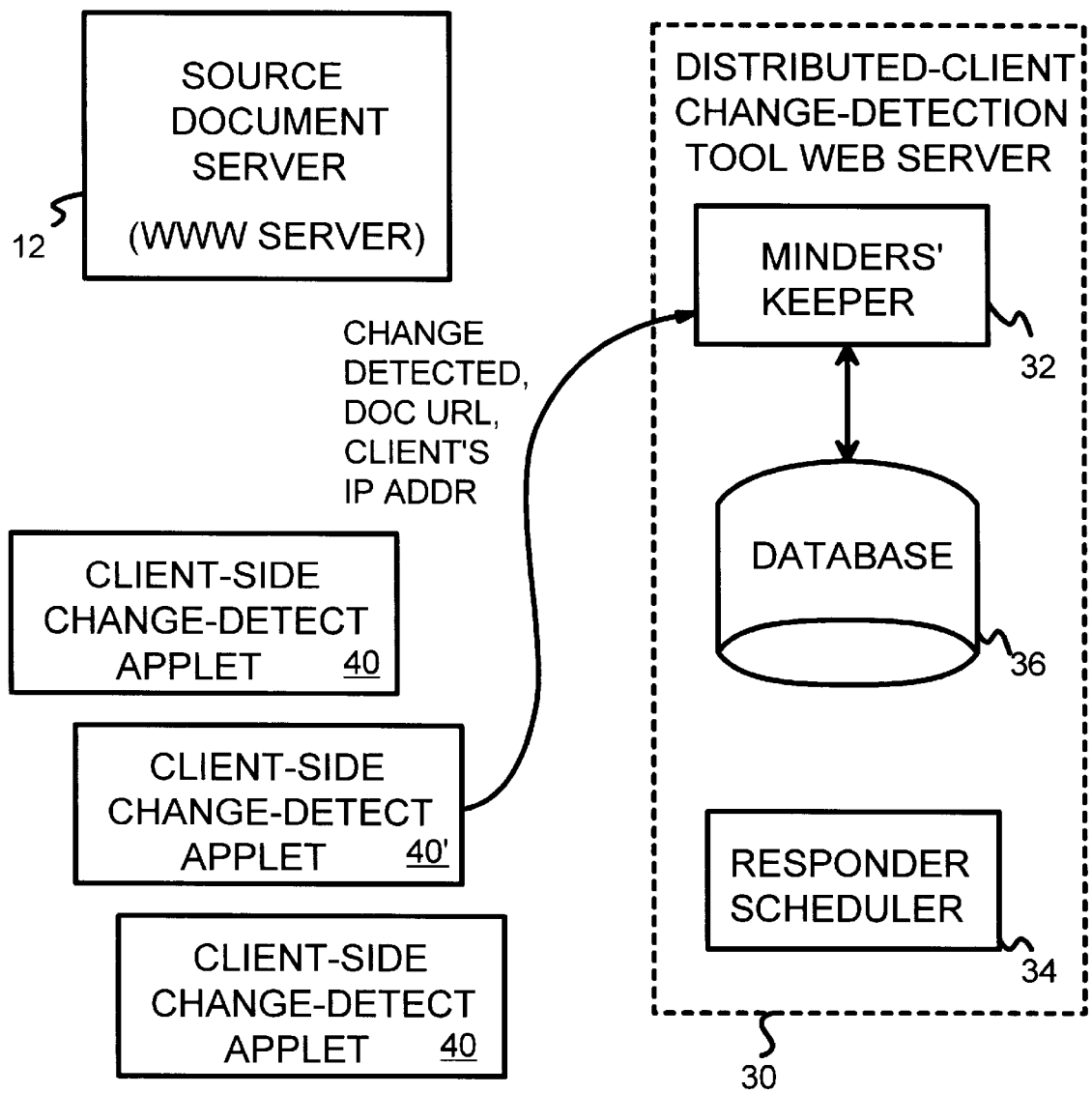
FIG. 6 shows a document-change notice being generated by the client and sent to the server.

FIG. 6 shows a document-change notice being generated by the client and sent to the server. When a change has been detected by the minder application on client 40', a change notice is sent by e-mail to server 30. Minders' keeper 32 on server 30 receives the change notice from the client.

The client's change notice specifies the document's URL, and the client's e-mail address or IP address to identify the client. The change notice from client 40' can be sent by e-mail, or a connection from the client minder application can be made to server 30 using TCP/IP packets. The TCP/IP connection can be faster than the e-mail notice and confirmation is immediate.

Figure 7:
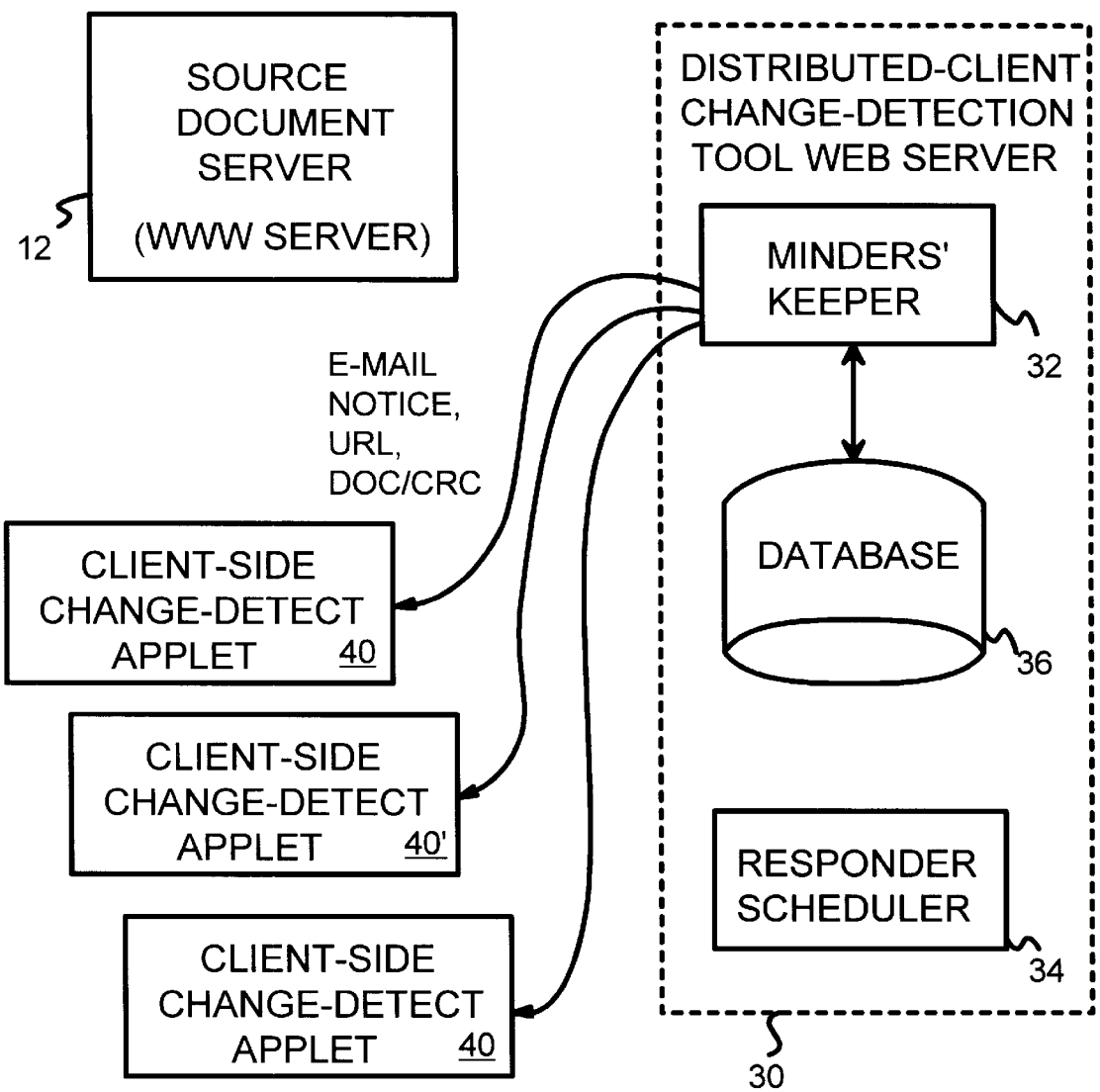
FIG. 7 shows a document-change notice being generated by the server and sent to all the users.

FIG. 7 shows a document-change notice being generated by the server and sent to all the users. When a change has been detected by a minder application on client 40', minders' keeper 32 is notified. Minders' keeper 32 verifies that a new change has been reported. Verification is necessary because some clients report old changes that have already been reported by other clients. Minders' keeper 32 reads the record for the reported URL to determine if the reported change has already been reported by another client. Change notifications from clients can be time/date stamped and the time/date stamp for the most recently reported change stored in database 36.

Verified changes cause minders' keeper 32 to send a change notice by e-mail to all registered users for the changed URL at clients 40. All of the users' e-mail addresses are fetched from database 36 by minders' keeper 32. The new CRC generated from the fresh copy of the registered document, or the entire document, is written to database 36 so that future comparisons reflect the recent changes. This new CRC or document is sent to all client minder applications for the registered URL to update their small client-side databases with the most recent document. The URL of the changed document is included in the notice to all users to identify that web page has changed. Users often register many different web pages for change detection.

Figure 8:
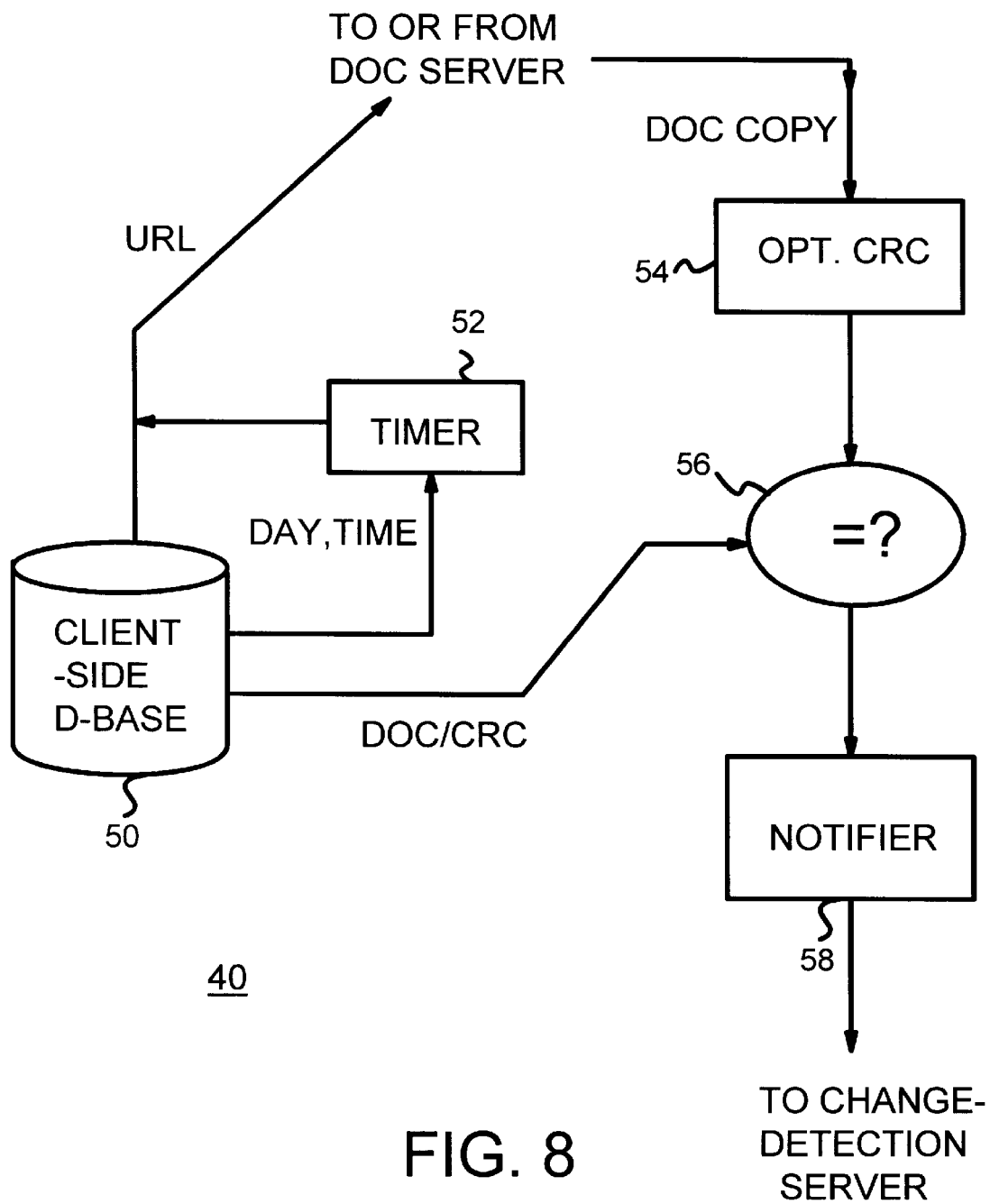
FIG. 8 is a diagram of a client-side minder application for performing change detection at a client scheduled by a server.

Client-Side Minder Application—FIG. 8

FIG. 8 is a diagram of a client-side minder application for performing change detection at a client scheduled by a server. The minder application is a thin client application program executing on client 40. During registration. This minder application is downloaded from the change-detection server, and a date and time for change detection is assigned to this client by the server. The date, time, URL of the document, and either the document itself, or a CRC of the document is written to a record in client-side database 50, a small database or storage area for use by the minder application.

Timer 52 compares the current date and time of the client's system clock to the assigned date and time stored in database 50. When the system's date and time pass the assigned date and time, timer 52 activates a change-detection procedure. Timer 52 also checks to determine if an Internet connection is active. For dial-up Internet access, timer 52 either initiates a new dial-up session using communications software on client 40, or waits until a new dial-up connection is made, and then performs change detection. Timer 52 may have to wait for several hours or days until the next Internet connection is made.

TCP/IP packets are generated to open a connection on the Internet to the source document server to retrieve the document pointed to by the URL stored in database 50. Network software already residing on client 40 is used to transmit these packets to the source document server, and retrieve a fresh copy of the document. Multiple TCP/IP packets may be needed to transfer the entire document.

Once the fresh copy of the document is retrieved from the document server, it is optionally check-summed by CRC generator 54. An archived copy of the document or its CRC is read from database 50. Comparator 56 compares the archived document to the fresh copy of the document, or compares their CRC signature to detect any changes.

When a mis-compare occurs, the document has changed. Notifier 58 generates a change notice to the change-detection server. This notice includes the URL of the changed page, and the e-mail address or the IP address of client 40. A time/date stamp of when the document was retrieved may be included, and even the fresh copy of the document could be included in the change notice. The change notice can be sent to the server by e-mail, or a connection to the server can be made using TCP/IP packets.

Figure 9:
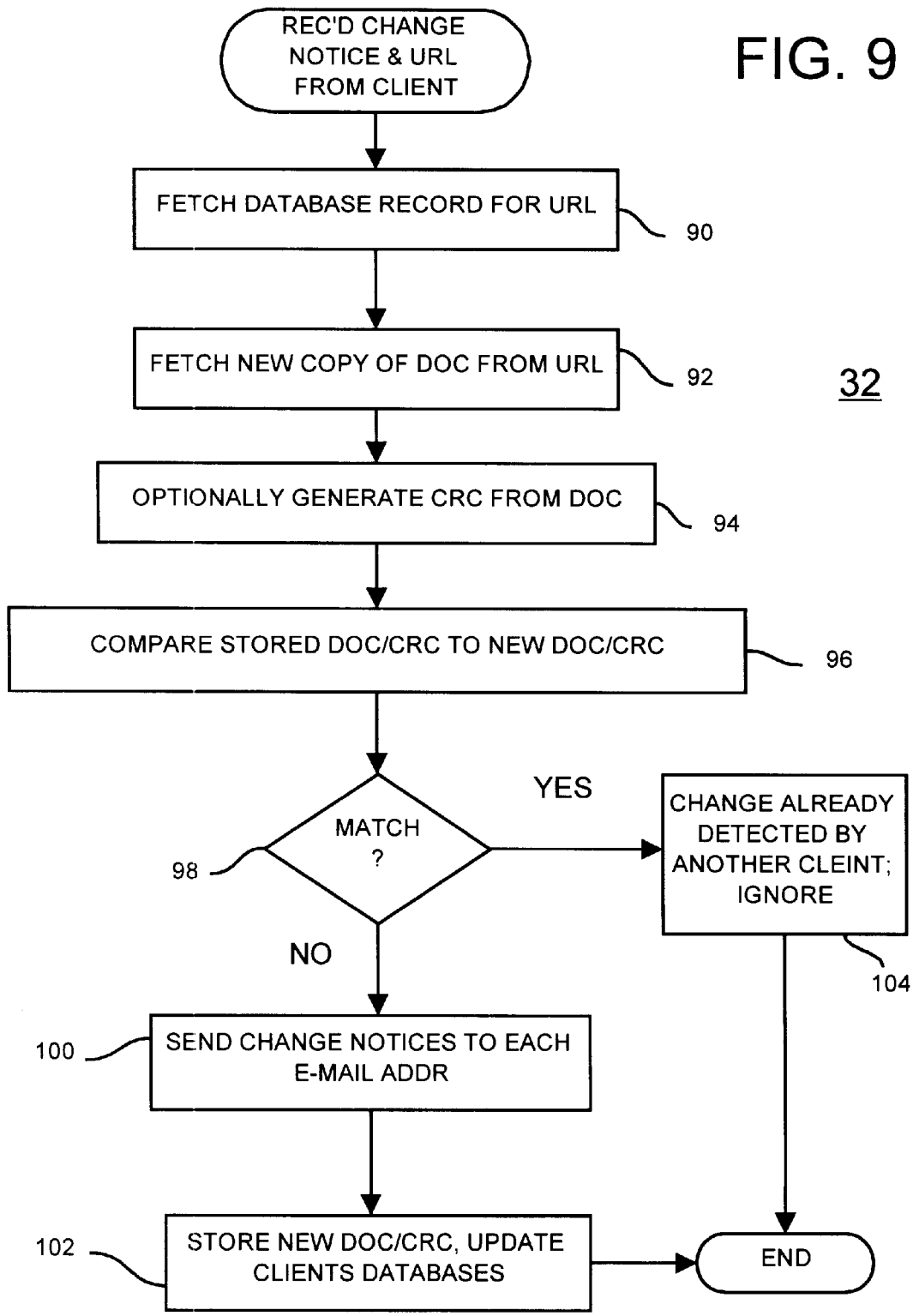
FIG. 9 is a flowchart of client-detected-change verification and notification by the minders' keeper on the server.

Minders' Keeper on Server—FIG. 9

FIG. 9 is a flowchart of client-detected-change verification and notification by the minders' keeper on the server. Minders' keeper 32 receives change notices from the client minder applications when changes are detected by clients. The URL pointing to the changed document is contained in this notice. The record for the URL is read from server's database 36 of FIG. 3 (step 90), and a new copy of the document is retrieved from the source documents server over the Internet using the URL, step 92.

When checksums are stored in database 36 rather than the entire document, then the checksum or CRC or the newly-retrieved copy of the document is generated, step 94. The stored document or CRC from database 36 is compared to the fresh document or CRC, step 96. When mis-match is detected, step 98, then a valid change was reported by the client. Change notices are generated to all the clients having this URL registered, which are sent by e-mail, step 100. A notice is also sent to the client that detected the change.

The new document (or its CRC) is stored in database 36, step 102. The time and date stamp of when the client detected the change can also be written to the database. Steps 92, 94, 96 can be slipped when the time/date stamp for the last reported change stored in database 36 is more recent than the time/date stamp for the newly reported change. Client databases can be updated with the new document to prevent them from reporting already-detected changes. Push technology can be used to send the new document or its CRC to the client minder applications.

When step 98 determines than the newly fetched document matches the archived copy of the document, then an already-detected change was reported by the client. Perhaps another client found the change first. The change notification is ignored, step 104.

Minders' keeper 32 also performs its own server-side change detection as described in greater detail in the parent application. Server-side change detection is performed for all registered pages at least once a week, so that even web pages with few registered users are checked weekly. More popular pages benefit from the many clients each checking for changes at their scheduled times. Change detection for these popular pages is performed several times each day by the pool of clients. As more users are registered, change detection is performed more frequently. The most popular pages with tens of thousands of registered users are checked every few minutes.

Figures 10, 11:
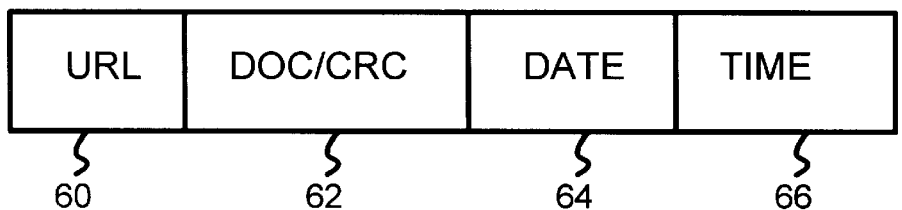
FIG. 10 is a diagram of a change-detection record used by the minder application at the client.
FIG. 11 is a diagram of a database in the change-detection server for coordinating clients.

Client-Side Database Record—FIG. 10

FIG. 10 is a diagram of a change-detection record used by the minder application at the client. Client database 50 may contain several of these records, one for each registered page. URL field 60 contains the URL pointing to the web-page document. Document field 62 contains a copy of the entire web-page document, or just a condensed CRC checksum of the document. Date field 64 and time field 66 are written by the responder-scheduler of the change-detection server with the assigned date and time for this client to perform change detection for the group of clients.

Server's Database—FIG. 11

FIG. 11 is a diagram of a database in the change-detection server for coordinating clients. Database 36 is composed of many records for the web pages registered by users. This database resides on change-detection server 30 of FIG. 3. Each record contains URL field 70, which identifies the registered document. Document field 72 contains either a copy of the entire document, or a CRC checksum for the document. The CRC requires much less storage space than the document.

Associated with URL field 70 and document field 72 is a series of user records for each of the registered users. A relational database may be used to associate URL's with user records. For each user registering the URL of URL field 70, an e-mail address and IP address for the user is stored in e-mail fields 74 and IP address field 76. The date and time assigned by the server to each client for change detection is stored in date fields 78 and time fields 79. The user records may be arranged or indexed by time and date to facilitate assignment of new times and dates to newly registered users.

Server Scheduling of Clients

Figures 12, 13:
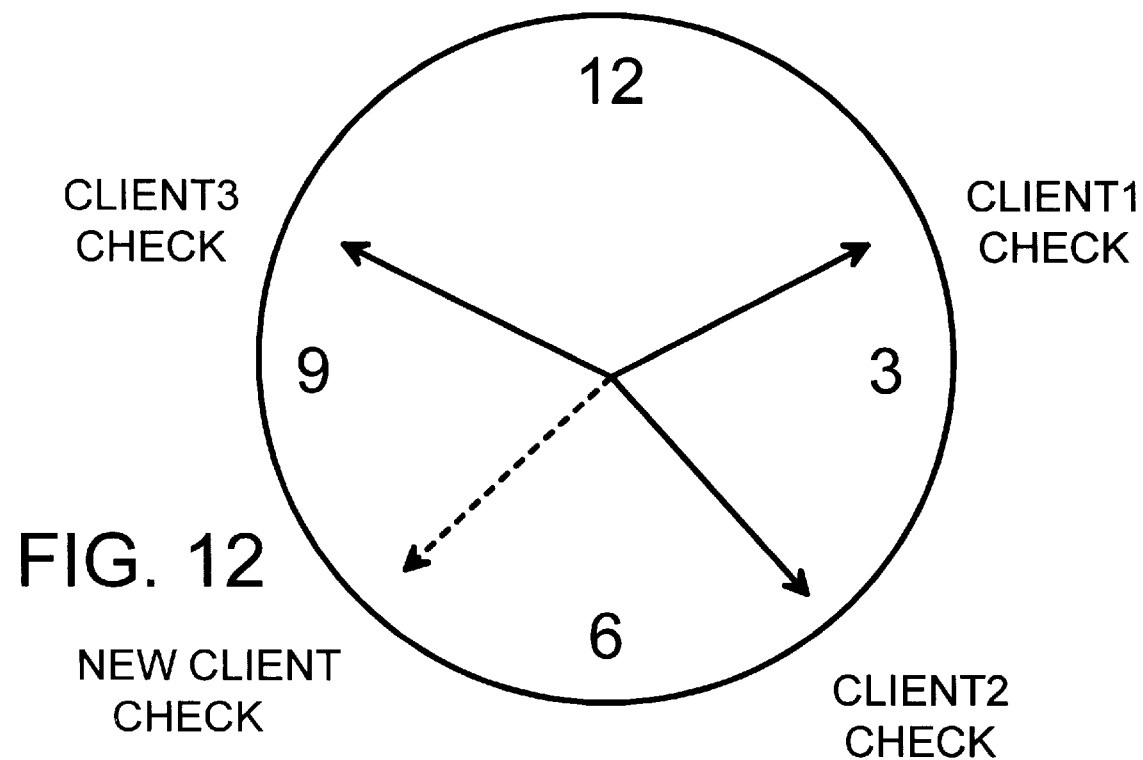
FIG. 12 is a diagram illustrating clients scheduled for change-detection by the change-detection server.
FIG. 13 is a calendar illustrating scheduling of client checking over a month.

FIG. 12 is a diagram illustrating clients scheduled for change-detection by the change-detection server. Client 1 has already been assigned to perform change detection at 2:00, while client 2 checks the same document at 4:30. Client 3 checks the web page at 10:00. Other clients are assigned times for other 12-hour periods.

When another user registers the same page, the responder-scheduler reads the assigned checking times and determines a new checking time for the new client. Since the gap between checking by client 2 and client 3 is largest in this 12-hour period, the new client is assigned to check at 7:30, performing an additional checking in between the checks by clients 2 and 3.

FIG. 13 is a calendar illustrating scheduling of client checking over a month. Only six clients have registered this particular web page. Client 1 is assigned to check for changes on the $2^{nd}$ day of the month, while client 2 is assigned checking on the $5^{th}$ day of each month. Client 3 checks on the $9^{th}$, and client 4 checks on the $18^{th}$. Checking is also performed on the $22^{nd}$ and $27^{th}$ by clients 5 and 6. The time assigned to each client is not relevant and can be the same for all clients.

The server may also perform checking once a week. Even with only six registered users, change detection is doubled in frequency to about twice a week rather than just once a week with server-only change-detection. Each client performs change detection just once a month—a very low burden on each client. More frequent checking by each client quickly improves checking. Weekly checks by each client provides daily change-detection. Many variations and combinations of checking assignments are possible.

Checksums Used Rather Than Whole Documents

Rather than store entire web-page documents in the server's and client's database, a condensed checksum can be stored and compared as described in greater detail in the parent application. A cyclical-redundancy-check (CRC) is performed on the original document and stored in the database. During checking, a CRC is generated of the fresh copy of the document. Should the CRC's not match, then a change is detected.

Detection of Only a Portion of a Web Page

As described more fully in the parent application, each user can select which portions of the web page document are to be compared for changes. Responder-scheduler 34 or preferably the client-side application fetches the web page and displays the page to the user. The user selects paragraphs of text by dragging a highlight across the text. Responder-scheduler 34 of FIG. 3 stores the location of the selected text and generates one or more CRC's for the selected text.

When the change detected is in a portion of the document not selected by a user when registering the document, a change notice is not sent to that user. Thus changes to non-selected portions of a registered document do not generate change notices. This allows the user to filter out irrelevant changes, such as date changes or access counters that are frequently updated. Other users can select other portions of the document, or the whole web page.

When used with partial-page detection, the present invention's change-detection application still performs change detection on the whole web page so that any user's change is detected. The server is notified when any change is found, not just changes in the user-defined portions of the web page. Minders' keeper 32 on the server then determines which portion of the web page have changed, and then notifies only those users having that portion of the page registered for change detection, or users with the whole page registered.

Thus the client-side minder application is kept simple, performing only whole-page change detection. The more complex partial-page detection can be performed by the change-detection server once a client has found a change. A most-sensitive filter can be used for all clients to filter out unwanted changes such as access counters.

Advantages of the Invention

The invention has several advantages over prior-art stand-alone notification programs. Stand-alone programs do not pool resources with other users, and each user must perform his own change detection on a frequent basis. Many users checking the same web page generates redundant traffic to fetch the web page. The total network traffic is reduced with the invention since each user performs change-detection less frequently since other users also perform detection. Document-server overloading is mitigated as fewer users are checking for changes, and at a lower frequency. All users benefit from each user's change detection.

As more users are registered, change detection is performed more frequently. The most popular pages with tens of thousands of registered users are checked every few minutes. Each user is notified within minutes of any changes in the registered web page, even though any one user only performs change-detection once a month.

Less popular web pages are still checked at least weekly by the server, while popular web pages are checked orders of magnitude more frequently, possibly every few minutes. Thus more resources and better service is provided for the more popular pages.

The change-detection server offloads some of the change-detection workload to the clients. The change-detection tool is automatically scalable as new users register. Computing and network resources are automatically increased as additional pages are registered by additional clients. The user's clients supply these additional resources, reducing capital outlays for additional servers.

Power users can be charged for using advanced features or functions while the general public is allowed to use the basic features free of charge. Thus power users can be charged for the additional storage and computational work required for registering some documents while casual users can freely register documents using the more efficient or less robust settings.

Other web sites can include a brief message on their page that their users can be notified by e-mail when the page changes. The user selects the message and enters his or her e-mail address. The web site then sends an e-mail request to the change-detection tool at a different web site. The request contains the user's e-mail address and the URL of the web page. Thus existing web sites can be enhanced to provide update notices to users by including a brief message on the page itself. The change detection is handled in the normal way by the change-detection-tool's web site.

Alternate Embodiments

Several other embodiments are contemplated by the inventors. For example the tool has been described as for use in the public Internet, but it could also be used by private organizations behind a corporate firewall on an Intranet or to select customers over an ExtraNet.

The resources of each client can be stored in the server's database, or used to schedule change detection. For example, a user with a direct Internet connection is always connected to the Internet, and change detection scheduled at any time is likely to occur on time. A user with a dial-up Internet connection is not likely to perform change detection when scheduled, and this user's change detection is less reliable. The scheduler may chose to schedule the dial-up user at a non-critical time, when other clients are also scheduled. A home user could be scheduled for weekends or nights when home users often dial-in to the Internet, while a business user could be scheduled for weekdays or nights. Users with direct Internet connections can be assigned more frequent change detection than dial-in users. Users can be asked how often they wish to perform change detection for the group, and assigned monthly, weekly, daily, or hourly checking.

A JAVA application for registration can be written to be executed by the browser client. This application performs some of the functions of the responder, allowing the user to input registration information such as the e-mail address and URL. The registration application could also display the registered page and show a user interface. The registration application sends information to the change-detection tool web server once the user has finished registration. The application reduces the loading on the responder, since these functions are performed at the client rather than at the server. The final registration information can then be mailed to the server with the change-detection-tool minder.

The invention has been described as operating on Internet documents. These documents are often complex web pages containing several individual files such as for graphics, text, and motion video and sound. Sometimes these files include small programs such as cgi scripts. Standard world-wide-web pages use the hyper-text-transfer protocol (http), but other protocols can be used in the URL. Gopher and file-transfer-program (ftp) documents can also be registered using their URL's.

Database engines can also be registered as a "document". The registered URL can include the lookup keywords. When the minder checks the URL for changes, the database lookup is re-executed. The results of the lookup are used as the document retrieved. Thus the document can be the output from execution of a database lookup or another program. The document can thus be a temporary document or report rather than a static document.

Highlighting can be accomplished in a variety of ways. Placing characters in the left margin is a common way to highlight text. Some mail systems use color or other effects for highlighting. Premium service could check for changes more frequently than once a week or day, perhaps checking every hour or even every few minutes. In addition to standard e-mail, the user can be notified immediately using a pager or personal-digital-assistant (PDA), or using a desktop push technology that continually sends updated Internet information to a user without using a standard browser or e-mail reader.

Change notification can be made for documents moved to another URL, documents that can no longer be found, or re-ordered documents. The record for a registration can store URL's and e-mail addresses in separate databases to improve storage efficiency. The URL field in the registration is then an index into the URL database. The e-mail field is likewise an index into the e-mail or users database. Using indexes improves efficiency since an index is used to point to the longer URL's and e-mail addresses. Typically a URL is shared by several users, and an e-mail address is shared by several registrations. The IP address need not be stored in the database when the e-mail address is also stored in the database and e-mail is used for notification.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A change-detection server for coordinating detection of changes in web pages by a plurality of clients, the change-detection server comprising:

a network connection for transmitting and receiving packets from a plurality of remote clients and a remote web-page server;

a responder, coupled to the network connection, for communicating with the plurality of remote clients, the responder registering a web page for change detection by receiving from a remote client in the plurality of remote clients a uniform-resource-locator (URL) identifying the web page;

an application downloader, responsive to the responder, for downloading a change-detection application to the remote client when the web page is registered by the remote client, the change-detection application periodically re-fetching the web page from the remote web-page server by transmitting the URL from the remote client directly to the remote web-page server; a scheduler, responsive to the responder, for generating an assigned time for the remote client to re-fetch the web page, the assigned time downloaded to the remote client during registration;

a server database, coupled to the responder-scheduler, for receiving the URL from the responder-scheduler and for receiving the assigned time from the scheduler after the web page is registered by the remote client, the server database for storing a plurality of records each containing a URL and a plurality of assigned times;

a client keeper on the change-detection server, coupled to the server database and the network connection, for receiving change notices from the plurality of remote clients, a detection notice generated by the change-detection application on the remote client when the web page re-fetched from the web-page server does not match an archived web page; and a notifier on the change-detection server, coupled to the client keeper and the server database, for generating change notices to all remote clients having registered the web page that generated the detection notice, whereby all remote clients are notified of a change when change-detection applications in the plurality of remote clients detects a change, and whereby the change-detection server assigns times for change detection by the plurality of remote clients.

2. The change-detection server of claim 1 wherein the assigned time for change detection is different for each remote client, whereby change detection by the plurality of remote clients occurs at different assigned times.

3. The change-detection server of claim 2 wherein the assigned time includes a date and a time during the date, wherein remote clients perform change detection on different dates and times assigned by the change-detection server, wherein each remote client performs change detection less than once a day while change detection is performed at least once a day by at least one of the plurality of remote clients for any date.

4. The change-detection server of claim 1 wherein the server database does not store the web page, the server database storing a checksum of the web page, whereby storage requirements for the server database are reduced by archiving the checksum and not entire web pages.

5. The change-detection server of claim 1 further comprising:
a server-side minder, coupled to the server database and the network connection, for periodically re-fetching the web page from the remote web-page server by transmitting the URL from the server database to the network connection, the server-side minder receiving a fresh copy of the web page from the remote web-page server, the server-side minder generating the detection notice to the client keeper when the fresh copy of the web page does not match archived web page,
whereby both the change-detection server and the plurality of remote client perform change detection.

6. The change-detection server of claim 5 further comprising:
a verifier in the client keeper, for verifying that the detection notice is for a new change and not for a change that has already been reported by another remote client, the verifier discarding the detection notice and not generating the change notices when the verifier determines that the detection notice is not for a new change.

7. The change-detection server of claim 6 further comprising:
selection means, coupled to the responder, for receiving a selection from the remote client, the selection identifying a desired portion for change detection within the web page;
parsing means, coupled to the responder, for parsing the web page and generating markers identifying the location of the desired portion, the markers stored in the server database; and
partial compare means, coupled to the server-side minder, for detecting changes in the desired portion of the web page located by the markers;
wherein the notifier does not generate a change notification to the remote client unless a change is detected in the desired portion of the web page.

8. The change-detection server of claim 1 wherein the web page is a hyper-text markup-language (HTML) web page containing HTML tags, the HTML tags for indicating formatting, layout, and hyper-links specifying URLs of other servers.

9. The change-detection server of claim 8 wherein the change-detection application downloaded from the change-detection server to the remote client is a JAVA application program.

10. The change-detection server of claim 1 wherein the notifier further comprises:
mailer means, coupled to the network connection, for sending a change notification message to remote clients when the change is signaled,
wherein the responder receives an electronic-mail address from the remote client, the responder storing the electronic-mail address of the remote client in the server database, and the mailer means reading the electronic-mail address from the server database, the change notification message being sent to the remote client as an electronic-mail message addressed to the electronic-mail address,
whereby the remote client is notified of the change by electronic mail.

11. The change-detection server of claim 1 wherein the packets transmitted to the network connection are TCP/IP packets and wherein the remote client and the remote web-page server are on the Internet.

12. A computer-implemented method for change detection of a web page by distributed clients coordinated by a server that notifies users of change, the method comprising the steps of:
registering the web page by:
receiving an address of a remote client operated by a user and a locator for the web page;
fetching the web page from a remote server by transmitting the locator to a network server;
downloading a change-detection application from the server to the remote client;
transmitting an assigned time for the remote client to perform change detection of the web page using the change-detection application;
storing the web page, the locator, the assigned time, and the address of the user in a server database;
at the assigned time, the remote client checks to determine if a change has occurred by:
reading the locator from a client database in the change-detection application and transmitting the locator to remote server to fetch a recent copy of the web page;
comparing the recent copy of the web page to an archived copy of the web page in the client database;
generating a detection notice to the server when the recent copy differs substantially from the archived copy;
signaling that a change is detected to other users with addresses stored in the server database associated with the locator for the web page when the detection notice is received by the server,
whereby the remote clients perform change detection at times assigned by the server.

13. The computer-implemented method of claim 12 wherein the detection notice from the remote client to the server includes the locator for the web page.

14. The computer-implemented method of claim 12 wherein the step of signaling that a change is detected to other users comprises:
reading the address of other users from the server database and sending a message to the address of each user stating that a change has occurred,
whereby the user is notified by a message when the change is detected.

15. The computer-implemented method of claim 14 wherein the web page is a web page on the world-wide web and the locator is a uniform-resource locator (URLs).

16. The computer-implemented method of claim 12 wherein each remote client performs change detection less than once a day while the period of time between change detection by any remote client of other users is less than an hour, whereby change detection occurs frequently although each remote client performs change detection infrequently.

17. A computer-program product comprising:
a computer-usable medium having computer-readable program code means embodied therein for detecting changes in a web page, the computer-readable program code means in the computer-program product comprising:
network connection means for transmitting and receiving packets from a remote client and a remote web page server;
responder-scheduler means, coupled to the network connection means, for communicating with the remote client, the responder-scheduler means registering web pages for change detection by receiving from the remote client a uniform-resource-locator (URL) identifying the web page and an identifier for the remote client, the responder-scheduler means downloading a client-side change-detection application to the remote client;

server-database means, coupled to the responder-scheduler means, for receiving the URL from the responder-scheduler means when the web page is registered by the remote client, the server-database means for storing a plurality of records each containing a URL and the identifier for each remote client registered for the URL;

the client-side change-detection application comprises a periodic minder means for periodically re-fetching the web page from the remote web page server by transmitting the URL from the remote client to a network, the periodic minder means receiving a fresh copy of the web page from the remote web page server, the periodic minder means comparing the fresh copy to an archived web page stored on the remote client; the periodic minder means generating a detection notice when the fresh copy does not match the archived web page; and a minders' keeper for receiving the detection notice from the remote client from the network connection means, the minders' keeper reading the server-database means for identifiers of remote clients and generating change notices to each remote client registered for the URL of the detection notice, whereby each remote client performs change detection for the benefit of all remote clients registered for the URL in the server-database means.

18. The computer-program product of claim 17 wherein the server-database means does not store a copy of the web page, the server-database means storing a checksum of the web page, whereby storage requirements for the server-database means are reduced by archiving the checksum.

19. The computer-program product of claim 17 wherein the responder-scheduler means, the server-database means, and the minders' keeper reside on a server while the client-side change-detection application executes on each remote client.

20. The computer-program product of claim 19 wherein the computer-readable program code means further comprises:

assignment means, coupled to the responder-scheduler means on the server, for assigning a plurality of dates and times for change detection to each remote client for each URL, the assignment means assigning different dates and times to remote clients to increase frequency of change detection of the URL, wherein the dates and times of change detection by the remote clients is assigned by the assignment means on the server.

* * * * *